United States Patent Office 3,595,809
Patented July 27, 1971

3,595,809
LANTHANUM CHROMIUM FERRITE CATALYST
William L. Kehl, Indiana Township, Allegheny County, Pa., assignor to Gulf Research & Development Company, Pittsburgh, Pa.
No Drawing. Filed June 27, 1969, Ser. No. 837,375
Int. Cl. B01j *11/32, 11/06*
U.S. Cl. 252—462                                             9 Claims

ABSTRACT OF THE DISCLOSURE

A hydrocarbon conversion catalyst comprising lanthanum, chromium, iron and oxygen in a lanthanum chromium ferrite perovskite-type structure.

---

The present invention relates to catalysts useful in the conversion and treatment of hydrocarbons, and more particularly it relates to lanthanum chromium ferrites of a perovskite-type structure and having a surface area of catalytic magnitude.

I have discovered that a material having a perovskite-type structure made from lanthanum, chromium and iron as the active components thereof and having a surface area of catalytic magnitude possesses excellent as well as unexpected catalytic activity for the conversion of hydrocarbons with excellent stability against decrease in conversion and activity over long periods of use. For example, the lanthanum chromium ferrite catalyst of this invention can be used continuously, without the frequent need for regeneration, in the oxydehydrogenation of butenes to butadiene. The catalyst of this invention can have the cations contained in a single phase perovskite-type compound that is a homogeneous lanthanum chromium ferrite, or as a heterogeneous composition containing a mixture of one or more of the oxides of said cations as well as the single phase, three cation perovskite-type compound.

The catalyst can be represented by the empirical formula $La_xCr_yFe_zO_3$ wherein $x$ can vary within the range of about 0.3 to about 1.25, $y$ can vary from about 0.1 to about 1 and $z$ can vary from about 0.1 to about 1.25. At the extremes of the ranges set forth herein, the homogeneity of the perovskite compound is not preserved and a mixture of the perovskite compound with oxides of the respective cations is obtained. Although the heterogeneous mixtures of the oxides and the perovskite compounds are active catalysts for oxidative dehydrogenation of hydrocarbons, it is considreed preferable to employ substantially homogeneous perovskite compounds. Substantially homogeneous perovskite compounds can be obtained within the composition range wherein $x$ can vary from about 0.7 to about 1, $y$ can vary from about 0.1 to about 1 and $z$ can vary from about 0.1 to about 1, with $x+y+z=2$. It is considered preferable, however, that the perovskite compounds have compositions wherein $x$ can range from about 0.7 to about 1, $y$ can range from about 0.5 to about 0.75 and $z$ can range from about 0.45 to about 0.75, with $x+y+z=2$. Optimally, the catalyst is a single phase perovskite compound having the empirical formula $La_{0.8}Cr_{0.65}Fe_{0.55}O_3$.

Compositions of hte perovskite-type crystalline structure are defined by the empirical formula $ABO_3$. In the ideal perovskite-type material, the A cation is coordinated to twelve oxygen atoms while the B cation occupies octahedral sites and is coordinated to six oxygen atoms. The ideal perovskite-type crystalline structure is cubic. I have found that in my novel lanthanum chromium ferrite the chromium and iron, which occupy the octahedral sites, together with the lanthanum introduce a deformation and straining of the crystal lattice as a result of differences in atomic sizes and ionic forces from the ideal. It is my opinion that these deviations in the lattice structure resulting from my novel combination of lanthanum, chromium and iron in this perovskite-type structure are responsible for an unexpectedly enhanced catalytic activity.

The lanthanum chromium ferrites can be conveniently prepared by employing as starting materials salts of lanthanum, chromium and iron, in which salts the metals are contained as cations. Any such salt of said metals is satisfactory; however, it is preferred to employ inorganic salts of the metals, such as, for example, nitrates, carbonates, acetates and halides. These salts containing the metals as cations are then admixed with a basic reactant in order to precipitate the precursor of the final product. It is necessary to maintain this addition mixture at a high pH—above about 8, and preferably above about 9. It is considered preferable to vigorously stir the metal salts in order to reduce any pH gradients through said addition mixture.

In order to prevent the inclusion in the precursor, and thus in the final product, of any contaminant it is essential that either a volatilizable base or a base containing no deleterious contaminants such as, for example, sodium, be employed. Any base which can be vaporized readily under the conditions used for drying the calcining can be employed, such as, for example, ammonium carbonate, ammonium bicarbonate and ammonium hydroxide. It is considered preferable, however, to employ an aqueous ammonia solution as the volatilizable base.

After precipitation, advantageously the precursor is washed, again at a pH above about 8, and preferably above about 9, and then dried and calcined. This drying and calcining can effectively be accomplished by any of the techniques well known in the art. Generally, drying can be accomplished at temperatures from about 100° C. to about 150° C. for a period of from about 4 to about 60 hours, while calcining can be effected at temperatures ranging from about 350° C. to about 800° C. for a period of from about 2 to 16 hours.

It has been found that both lanthanum and iron hydroxides can be precipitated substantially completely from an aqueous solution of their respective nitrates at a pH of 11.0 to 11.8 employing ammonium hydroxide as the precipitating agent, but both have been found to remain partially in solution at pH less than or equal to 10. Chromium, however, is precipitated most completely from a solution of the nitrate at pH 9.0 to 9.5. Accordingly, a convenient method for the preparation of lanthanum chromium ferrites comprises co-precipitating the lanthanum and iron hydroxides in ammonium hydroxide at a pH of about 11.5 in one reaction vessel, and precipitating the chromium separately in ammonium hydroxide at a pH of about 9.0 to 9.5 in a second reaction vessel. After both precipitates have been washed several times by decantation, they are combined, mixed thoroughly, preferably with heating at about 90° C., for several hours. Thereafter, the resulting mixture of the combined precipitates is recovered by filtration, dried at about 120° C. and calcined for 16 hours at about 650° C. to form the lanthanum chromium ferrite catalyst.

The catalyst can be employed with or without a filler or carrier material and can be pelletized or formed employing conventional techniques. Suitable carrier materials are, for example, rough granular aluminas, zirconias, granular silicon carbide and other similar inert materials. Supported catalysts can be prepared by thoroughly mixing the granular particles of the carrier material with a thick wet slurry of the washed mixture of combined precipitates prior to drying and calcining. The slurried mixture can thereafter be dried at about 120° C. and calcined at about 650° C. to provide granular particles of the supported catalyst.

In order that this lanthanum chromium ferrite composition possess catalytic activity for the conversion of hydrocarbons it is essential that it be formulated with a significant surface area, that is, a surface area of at least about 0.1 to about 0.5 m.²/g. and preferably a surface area of at least about 1.0 m.²/g. For example, in the oxydehydrogenation of butene-1 to form butadiene, a surface area of about 5 m.²/g. has been found to be satisfactory. In using a surface area significantly higher than this it has been found that it is more difficult to extract the heat evolved in this highly exothermic reaction. For some uses a surface area of at least about 10 m.²/g. is preferred. In making the unsupported lanthanum chromium ferrite material, a surface area of about 30 to about 50 m.²/g. can be produced. If a finished catalyst of lower surface area is desired, this material is sintered under controlled conditions to reduce the surface area to a desired level. The supported lanthanum chromium ferrite can be produced with a higher surface area than the unsupported material, if desired, with the resulting supported surface area being a function of the surface area of the support.

I now describe by way of specific examples the use of my invention, however, these examples are not to be construed in any manner as limiting my invention.

EXAMPLE 1

A dilute ammonium hydroxide solution was slowly added with vigorous stirring to a solution containing 186 grams of $La(NO_3)_3 \cdot 6H_2O$, 85.8 grams $Cr(NO_3)_3 \cdot 9H_2O$ and 87.0 grams $Fe(NO_3)_3 \cdot 9H_2O$ in 3000 cc. of water until the pH reached 8.0. The precipitate was decanted after settling and filtered. After washing and drying the filtrate, it was calcined at 650° C. for 8 hours. The resulting calcined product was determined to have the composition $La_{.8}Cr_{.65}Fe_{.55}O_3$ by X-ray fluorescence analysis. X-ray diffraction analysis showed that a lanthanum chromium ferrite having the perovskite structure was the major phase together with a very minor oxide phase. The surface area of this product was determined to be 7.4 m.²/g.

The characteristic X-ray diffraction pattern for this lanthanum chromium ferrite material having the empirical formula of about $La_{.8}Cr_{.65}Fe_{.55}O_3$ consists of lines with the following $d$ spacings and relative intensities:

| $d$ (A.): | $I/I_o$ |
| --- | --- |
| 3.91 | 25 |
| 2.76 | 100 |
| 2.25 | 20 |
| 1.95 | 30 |
| 1.74 | 10 |
| 1.59 | 30 |
| 1.38 | 12 |

The relative intensities and the width or sharpness of the lines in the patterns from these compounds will vary with changes in the relative concentrations of the cations in the structure. Inhomogeneity in the catalyst compositions is manifested by additional or double lines in the pattern.

A stream of butene-2 admixed with steam and oxygen in a mol ratio of steam to butene-2 of 15 to 1 and of butene-2 to oxygen of 1 to 1 was passed over 4 cc. of this catalyst at a flow rate for this gas mixture of 510 cc. per minute and a temperature of 375° C. A 52 percent conversion of the butene-2 resulted at a selectivity of 75 percent to butadiene. This was strikingly superior to the yield obtained when using either lanthanum ferrite or lanthanum chromite as the catalyst. After use, the minor oxide phase in the catalyst was found to disappear by incorporation into the lanthanum chromium ferrite perovskite-type structure. This reaction can be carried out for long periods of time without sufficient loss in activity or selectivity to require regeneration. When regeneration is required, the catalyst is calcined in air at 500° C. to 650° C.

EXAMPLE 2

A solution of 242.4 grams of $Fe(NO_3)_3 \cdot 9H_2O$ and 216.5 grams of $La(NO_3)_3 \cdot 6H_2O$ in 1000 cc. of water was slowly added with vigorous stirring to a dilute solution of ammonium hydroxide at a pH of 11.5 together with a sufficient amount of another dilute solution of ammonium hydroxide to maintain the pH at 10.5 to 11.0 throughout the reaction. A solution of 60 grams of $Cr(NO_3)_3 \cdot 9H_2O$ in 500 cc. of water was slowly added with vigorous stirring to a dilute ammonium hydroxide solution together with sufficient additional dilute ammonium hydroxide to maintain the pH at about 9.0 to 9.5. This precipitate containing the chromium was combined with the precipitate containing the lanthanum and and the iron and the mixture was boiled. After cooling the slurry, it was filtered, dried and calcined at 650° C. for 20 hours. X-ray diffraction analysis indicated a single phase lanthanum chromium ferrite having the perovskite and X-ray fluorescence analysis established a composition of $La_{.8}Cr_{.2}FeO_3$ for the material. Its surface area was determined to be 7.8 m.²/g.

This catalyst was used in the conversion of butene-1 to butadiene. A mixture of steam, butene-1 and oxygen containing 7.5 volume percent butene-1 and a mol ratio of butene-1 to oxygen of 1 to 1 was passed over the catalyst at a rate of 400 cc. per minute and a temperature of 400° C. A 44 percent conversion resulted with a selectivity of 73 percent to butadiene.

Other lanthanum chromium ferrite compositions of the perovskite-type structure were made including the compositions $La_{.7}CrFe_{.3}O_3$ and $LaCr_{.4}Fe_{.6}O_3$ and were tested in the conversion of butene to butadiene. It was determined that the compositions containing less than one mol of lanthanum exhibited superior catalytic properties in this use.

The catalysts as described herein can also be used for the oxydehydrogenation of aldehydes and ketones at good conversions and excellent selectivities. For example, isobutyraldehyde is converted to methacrolein, methyl ethyl ketone is converted to methyl vinyl ketone, etc. Additionally, it has been unexpectedly discovered that these lanthanum chromium ferrite catalytic materials catalyze the isomerization of butene-2 to butene-1 in a substantially oxygen-free environment. Also the lanthanum chromium ferrite catalyst is active for cracking hydrocarbons such as the cracking of 2,4-dimethylpentane.

It is to be understood that the above disclosure is by way of specific example and that numerous modifications and variations are available to those of ordinary skill in the art without departing from the true spirit and scope of the invention.

I claim:
1. A hydrocarbon conversion catalyst with the empirical formula $La_xCr_yFe_zO_3$ wherein $x$ ranges from about 0.3 to about 1.25, $y$ ranges from about 0.1 to about 1 and $z$ ranges from about 0.1 to about 1.25.
2. A hydrocarbon conversion catalyst in accordance with claim 1 having a surface area of at least about 0.1 m.²/g.
3. A hydrocarbon conversion catalyst in accordance with claim 2 wherein $x$ ranges from about 0.7 to about 1, $y$ ranges from about 0.1 to about 1 and $z$ ranges from about 0.1 to about 1.
4. A hydrocarbon conversion catalyst in accordance with claim 2 having a surface area of at least about 1.0 m.²/g.
5. A hydrocarbon conversion catalyst in accordance with claim 4 wherein $x$ ranges from about 0.7 to about 1, $y$ ranges from about 0.5 to about 0.75, and $z$ ranges from about 0.45 to about 0.75, and the sum of $x$, $y$ and $z$ equals 2.

6. A hydrocarbon conversion catalyst in accordance with claim 5 in which $x$ is about 0.8.

7. A hydrocarbon conversion catalyst in accordance with claim 6 in which $y$ is about 0.65 and $z$ is about 0.55.

8. A hydrocarbon conversion catalyst in accordance with claim 1 which comprises a catalytic amount of a lanthanum chromium ferrite in a perovskite-type structure having a surface area of catalytic magnitude.

9. A hydrocarbon conversion catalyst in accordance with claim 1 carried on an inert support.

References Cited
UNITED STATES PATENTS 3,450,789   6/1969   Kehl _____ 260—680

DANIEL E. WYMAN, Primary Examiner
P. M. FRENCH, Assistant Examiner

U.S. Cl. X.R.
252—470